(12) United States Patent
Nansaka et al.

(10) Patent No.: US 9,368,764 B2
(45) Date of Patent: *Jun. 14, 2016

(54) SEALED BATTERY AND METHOD FOR MANUFACTURING THE SAME

(71) Applicant: SANYO Electric Co., Ltd., Moriguchi-shi, Osaka (JP)

(72) Inventors: Kenji Nansaka, Habikino (JP); Yasuhiro Yamauchi, Sumoto (JP); Toshiyuki Nohma, Kobe (JP)

(73) Assignee: SANYO Electric Co., Ltd., Osaka (JP)

( * ) Notice: Subject to any disclaimer, the term of this patent is extended or adjusted under 35 U.S.C. 154(b) by 916 days.

This patent is subject to a terminal disclaimer.

(21) Appl. No.: 13/646,811

(22) Filed: Oct. 8, 2012

(65) Prior Publication Data

US 2013/0067728 A1 Mar. 21, 2013

Related U.S. Application Data

(63) Continuation of application No. 12/711,618, filed on Feb. 24, 2010, now Pat. No. 8,304,109.

(30) Foreign Application Priority Data

Mar. 10, 2009 (JP) .................................. 2009-055803

(51) Int. Cl.
*H01M 2/08* (2006.01)
*H01M 2/02* (2006.01)
(Continued)

(52) U.S. Cl.
CPC ................ *H01M 2/08* (2013.01); *H01M 2/021* (2013.01); *H01M 2/34* (2013.01); *H01M 10/04* (2013.01);
(Continued)

(58) Field of Classification Search
None
See application file for complete search history.

(56) References Cited

U.S. PATENT DOCUMENTS 3,529,463 A 9/1970 Orlando et al.
3,793,876 A 2/1974 Oswald
(Continued)

FOREIGN PATENT DOCUMENTS

JP 10-172618 A 6/1998
JP 11-329405 A 11/1999
(Continued)

OTHER PUBLICATIONS

Japanese Office Action dated Dec. 2, 2014, issued in corresponding Japanese Application No. 2013-234690 (2 pages).
(Continued)

*Primary Examiner* — Gregg Cantelmo
(74) *Attorney, Agent, or Firm* — Westerman, Hattori, Daniels & Adrian, LLP

(57) ABSTRACT

A sealed battery includes a sealing plate 13 sealing a mouth of an outer can, an external terminal 16 attached to the sealing plate 13 and having a connecting terminal 23, and a current interruption mechanism 18 interrupting current in response to pressure increase in the outer can that is installed in a conductive pathway electrically connecting the connecting terminal 23 and an electrode assembly. In the connecting terminal 23, a through-hole 23b continuing to the space on the current interruption mechanism 18 at the side corresponding to the outside of the battery is formed. The through-hole 23b is sealed with a terminal stopper 30 made of an elastic member so as to form a closed space between the terminal stopper 30 and current interruption mechanism 18. An electrolyte or washing solution hardly enters the current interruption mechanism during the manufacture can be provided.

9 Claims, 6 Drawing Sheets

(51) Int. Cl.
  *H01M 2/34*   (2006.01)
  *H01M 10/05*  (2010.01)
  *H01M 10/12*  (2006.01)
  *H01M 10/34*  (2006.01)
  *H01M 10/42*  (2006.01)
  *H01M 10/04*  (2006.01)
  *H01M 2/36*   (2006.01)

(52) U.S. Cl.
  CPC .............. *H01M 10/05* (2013.01); *H01M 10/12* (2013.01); *H01M 10/345* (2013.01); *H01M 10/42* (2013.01); *H01M 10/425* (2013.01); *H01M 2/0217* (2013.01); *H01M 2/36* (2013.01); *Y02E 60/124* (2013.01); *Y02E 60/126* (2013.01); *Y02P 70/54* (2015.11); *Y02T 10/7016* (2013.01); *Y10T 29/4911* (2015.01); *Y10T 29/49108* (2015.01)

(56) References Cited

U.S. PATENT DOCUMENTS

| | | |
|---|---|---|
| 4,099,404 A | 7/1978 | Eberle |
| 4,398,413 A | 8/1983 | Rao |
| 4,913,986 A | 4/1990 | Howard et al. |
| 5,602,328 A | 2/1997 | Palmer |
| 5,665,483 A | 9/1997 | Saito et al. |
| 6,132,900 A | 10/2000 | Yoshizawa et al. |
| 6,235,419 B1 | 5/2001 | Marukawa et al. |
| 6,635,379 B2 | 10/2003 | Onishi et al. |
| 6,673,489 B2 | 1/2004 | Fong et al. |
| 6,844,110 B2 | 1/2005 | Enomoto et al. |
| 2008/0038627 A1 | 2/2008 | Yamauchi et al. |
| 2008/0038628 A1 | 2/2008 | Yamauchi et al. |

FOREIGN PATENT DOCUMENTS

| | | |
|---|---|---|
| JP | 2006-202560 A | 8/2006 |
| JP | 2008-066254 A | 3/2008 |
| JP | 2008-066255 A | 3/2008 |

OTHER PUBLICATIONS

Chinese Office Action dated Nov. 13, 2013, issued in corresponding Chinese Patent Application No. 201010129488.X with English translation (9 pages).

Japanese Office Action dated Aug. 12, 2013, issued in corresponding Japanese Patent Application No. 2009-055803.

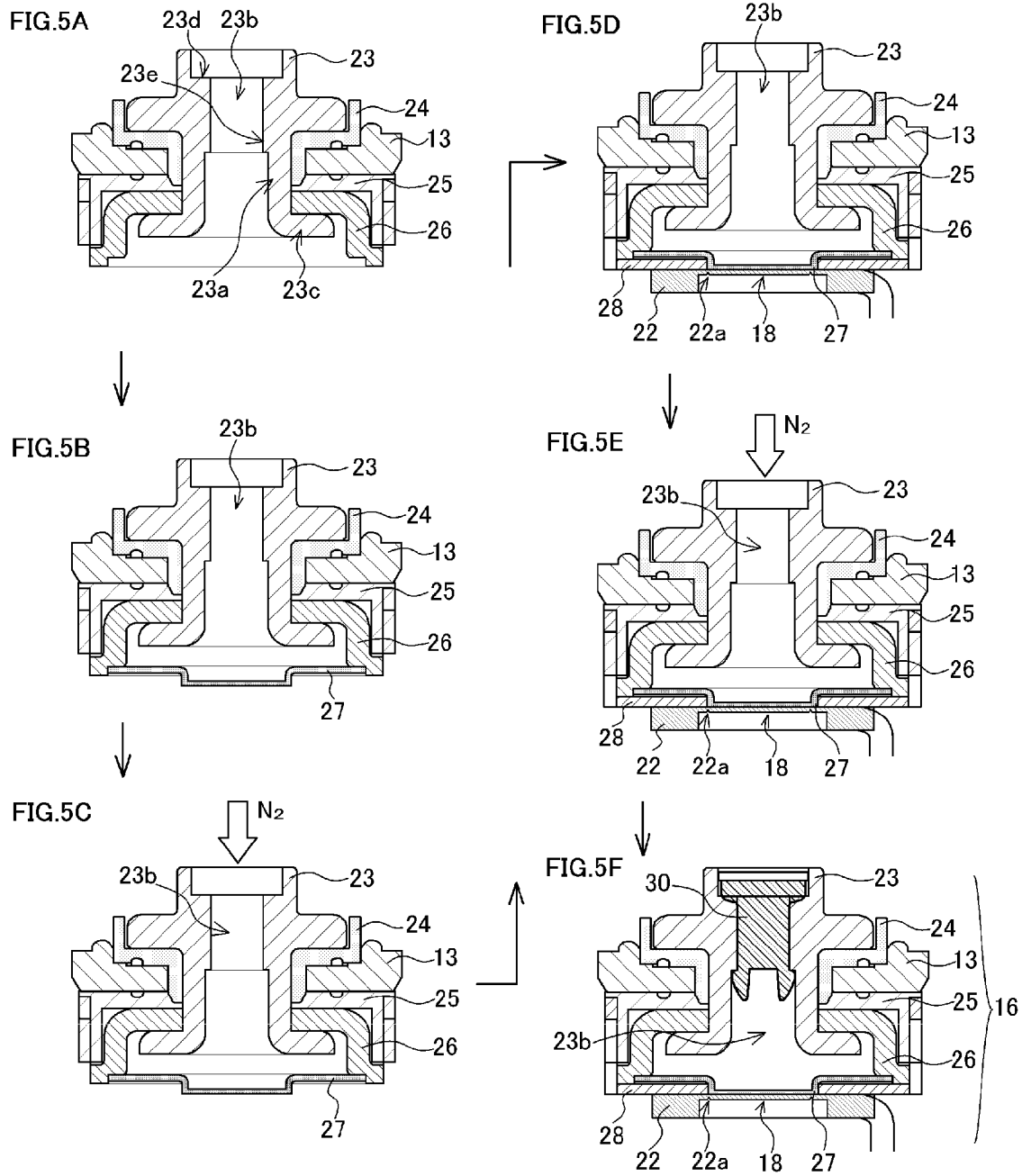

SEALED BATTERY AND METHOD FOR MANUFACTURING THE SAME

This application is a continuation application of U.S. patent application Ser. No. 12/711,618 filed Feb. 24, 2010, now U.S. Pat. No. 8,304,109, issued on Nov. 6, 2012, and is based upon and claims the benefit of priority from Japanese Patent Application No. 2009-055803 filed on Oct. 3, 2009, the entire contents of which being incorporated herein by reference.

TECHNICAL FIELD

The present invention relates to a sealed battery such as a nonaqueous electrolyte secondary battery and nickel-hydrogen secondary battery and, in particular, relates to a sealed battery with high reliability which includes a current interruption mechanism inside and a connecting terminal having a structure in which an electrolyte or washing solution hardly enters the current interruption mechanism during the manufacture, and a method for manufacturing the same.

BACKGROUND ART

As power supplies for driving portable electronic equipment such as cell phones, portable personal computers, and portable music players, alkaline secondary batteries represented by a nickel hydrogen battery and nonaqueous electrolyte secondary batteries represented by a lithium ion battery are widely used. Furthermore, exhaust controls of carbon dioxide gas and the like are being tightened up in view of the recent moves to protect the environment. Thus, in the car industry, not only automobiles using fossil fuels such as gasoline, diesel oil, and natural gas, but also electric vehicles (EVs) and hybrid electric vehicles (HEVs) have been developed actively. In addition, a recent sudden rise in the price of fossil fuels has accelerated the development of EVs and HEVs.

The batteries for such EVs or HEVs are required to have high output characteristics, so that each battery is upsized and a number of batteries are connected in series or in parallel to be used. In particular, the sealed batteries used for such applications need to have superior safety as compared with batteries for compact equipment because, in particular, the nonaqueous electrolyte secondary batteries use materials with very high reactivity. Thus, as shown in JP-A-2008-66254 and JP-A-2008-66255, the sealed battery used for EVs or HEVs is equipped with a gas exhaust valve for releasing internal pressure when the pressure in the battery outer can increases as well as with the current interruption mechanism for interrupting the electrical connection between an external terminal and an electrode assembly in the outer can.

That is, as shown in FIG. 6A, JP-A-2008-66254 discloses the invention of a sealed battery 50 which includes an external terminal 53 having a through-hole 52 through which a current interruption mechanism 51 communicates with the outer space of the sealed battery 50. Therefore, the current interruption mechanism 51 reliably works when the pressure in an outer can 54 increases. Furthermore, as shown in FIG. 6B, JP-A-2008-66255 discloses the invention of a sealed battery 60 which includes an external terminal 63 having a through-hole 62 through which a current interruption mechanism 61 communicates with the outer space of the sealed battery 60. Therefore, the current interruption mechanism 61 works when the pressure in an outer can 64 increases. In addition, in the sealed battery 60, the through-hole 62 is sealed with a resin film stopper 65 in order to prevent deterioration of the current interruption mechanism 61 from entering water or oxygen through the through-hole 62.

Each through-hole of the sealed batteries disclosed in JP-A-2008-66254 and JP-A-2008-66255 is installed in order that the space on the current interruption mechanism at the side corresponding to the outside of the battery communicates with the outside of the battery, so that the current interruption mechanism works easier when the pressure in the outer can increases. Thus, the resin film stopper 65 used in the sealed battery 60 disclosed in JP-A-2008-66255 needs to be thin and is not considered to be a strong stopper. Because of this, in the sealed battery 60 disclosed in JP-A-2008-66255, the film stopper 65 may be broken by any impact from the outside, and moreover, when the film stopper 65 is broken, entering water, oxygen, or the like from the outside may deteriorate the current interruption mechanism 61 as shown in JP-A-2008-66254.

However, experiments by the inventors reveal that the action of the current interruption mechanism makes substantially no difference whether the space on the current interruption mechanism at the side corresponding to the outside of the battery is closed or open. That is, even when the pressure in the outer can is increased for some reason, because the pressure of gas generated in the battery under abnormal conditions is very high, the pressure in the closed space on the current interruption mechanism at the side corresponding to the outside of the battery seldom simultaneously increases equally. Thus, there is no problem even when the space on the current interruption mechanism at the side corresponding to the outside of the battery is sealed.

SUMMARY

The present invention is based on the above described experimental results. An advantage of some aspects of the invention is to provide a sealed battery with high reliability including a connecting terminal having a structure in which an electrolyte or washing solution hardly enters a current interruption mechanism during the manufacture and a method for manufacturing the same.

According to a first aspect of the invention, a sealed battery includes: an outer can having a mouth; in the outer can, an electrode assembly having a positive electrode plate and a negative electrode plate equipped with a positive electrode collector plate and a negative electrode collector plate, respectively; a sealing plate sealing the mouth of the outer can; and an external terminal attached to the sealing plate and having a connecting terminal. In the sealed battery, the connecting terminal and the electrode assembly are electrically connected; in a conductive pathway electrically connecting the connecting terminal and the electrode assembly, a current interruption mechanism to interrupt current in response to pressure increase in the outer can, is installed; the connecting terminal includes inside a through-hole continuing to a space on the current interruption mechanism at a side corresponding to the outside of the battery; and the through-hole is sealed with a terminal stopper made of an elastic member to form a closed space between the terminal stopper and the current interruption mechanism.

The through-hole formed in the connecting terminal is for examining leakage of the current interruption mechanism in the assembly process, but during pouring an electrolyte or washing, the electrolyte or washing water may enter the through-hole of the connecting terminal. When the electrolyte or washing water enters the through-hole, the current interruption mechanism may corrode, which may cause a malfunction. In the sealed battery according to the aspect of the invention, the through-hole is sealed with the terminal stopper made of an elastic member, and moreover, the space enclosed with the through-hole and current interruption mechanism is made a closed space, so that the electrolyte or washing water does not enter the through-hole. Thus, the malfunction due to the corrosion of the current interruption mechanism does not occur, and consequently, a sealed battery with high reliability can be obtained.

Furthermore, in the sealed battery according to the aspect of the invention, the through-hole of the connecting terminal is tightly sealed with the terminal stopper made of an elastic member. However, the closed space is formed between the current interruption mechanism and the terminal stopper, and moreover, the pressure of gas generated in the battery under abnormal conditions becomes very high, so that the action of the current interruption mechanism is not adversely affected. The sealed battery according to the aspect of the invention is applicable to any of the following batteries: a battery in which the electrode assembly is for a nonaqueous electrolyte secondary battery; a battery in which the electrode assembly is for an aqueous electrolyte secondary battery such as a nickel-hydrogen secondary battery using an aqueous electrolyte; a battery in which the electrode assembly is a rolled electrode assembly which is formed by rolling a positive electrode plate and negative electrode plate with a separator interposed therebetween; and a battery in which the electrode assembly is a laminated electrode assembly which is formed by laminating a positive electrode plate and negative electrode plate with a separator interposed therebetween.

Furthermore, in the sealed battery according to the aspect of the invention, it is preferable that the terminal stopper includes the elastic member and a metal plate, and the metal plate is welded to the connecting terminal.

The terminal stopper may fall off by vibration and the like because of being composed of an elastic member. In the sealed battery according to the aspect of the invention, the terminal stopper composed of the elastic member and metal plate is used, and moreover, the metal plate is welded to the connecting terminal by laser welding or the like, so that the through-hole can be sealed more tightly. Here, the diameter of the metal plate is preferably substantially the same as or slightly larger than the head diameter of the terminal stopper.

Furthermore, in the sealed battery according to the aspect of the invention, it is preferable that: the through-hole formed in the connecting terminal includes a large diameter portion formed outside of the outer can and a small diameter portion formed inside of the outer can; the terminal stopper includes, at an upper end, a head portion having a diameter larger than that of the small diameter portion of the through-hole and smaller than that of the large diameter portion of the through-hole, at a lower end, a protruding portion having a diameter smaller than that of the head portion and larger than that of the small diameter portion of the through-hole, a locking portion tapering from the protruding portion, and between the head portion and the protruding portion, a connecting portion having almost the same diameter as that of the small diameter portion of the through-hole and having substantially the same length as that of the small diameter portion of the through-hole; and the terminal stopper is attached to the through-hole in which the head portion is placed on a side of the large diameter portion of the through-hole and the locking portion is protruded from an end of the small diameter portion of the through-hole.

The through-hole formed in the connecting terminal in the sealed battery according to the aspect of the invention includes the large diameter portion formed outside of the outer can and the small diameter portion formed inside of the outer can, and the cross section is T-shaped. Furthermore, the terminal stopper used in the sealed battery according to the aspect of the invention includes, at the upper end, the head portion having a diameter larger than that of the small diameter portion of the through-hole formed in the connecting terminal and smaller than that of the large diameter portion of the through-hole, at the lower end, the protruding portion having a diameter smaller than that of the head portion and larger than that of the small diameter portion of the through-hole, the locking portion tapering from the protruding portion, and between the head portion and the protruding portion, the connecting portion having almost the same diameter as that of the small diameter portion of the through-hole and having substantially the same length as that of the small diameter portion of the through-hole. Thus, when the terminal stopper is inserted from the locking portion side into the through-hole formed in the connecting terminal, because the terminal stopper is composed of an elastic member, the protruding portion is deformed to pass through the small diameter portion of the through-hole, and protruded from the small diameter portion of the through-hole to recover the original shape. At the same time, the head portion of the terminal stopper is caught by the small diameter portion of the through-hole to fit into the large diameter portion of the through-hole. Therefore, in the sealed battery according to the aspect of the invention, the terminal stopper is tightly fixed to the connecting terminal, and thus an electrolyte or washing water still does not enter the through-hole.

Furthermore, in the sealed battery according to the aspect of the invention, it is preferable that the current interruption mechanism is deformed in response to pressure increase in the outer can to interrupt electrical connection between the connecting terminal and the electrode assembly.

In the sealed battery according to the aspect of the invention, when the current interruption mechanism is deformed in response to the pressure increase in the outer can, the deformation is not inhibited, because a space is formed between the current interruption mechanism and terminal stopper. Thus, with the sealed battery according to the aspect of the invention, when the pressure in the outer can increases, the current interruption mechanism can be reliably deformed to reliably interrupt the electrical connection between the connecting terminal and electrode assembly. Here, the current interruption mechanism may include a metal plate for sealing so as to form a predetermined space in the through-hole of the connecting terminal, and a collector welded to the metal plate and having a cyclic thin-wall groove around the periphery of the welded part, or metal foil that is welded to the metal plate and to a collector around the periphery of the welded part. Therefore, the current interruption mechanism can employ the structure in which the collector is broken along the cyclic thin-wall groove or the metal foil is broken when the pressure in the outer can increases to deform the metal plate. In this case, the space enclosed with the through-hole of the connecting terminal and the current interruption mechanism is not required to communicate with the outside and may be a closed space.

According to another aspect of the invention, a method for manufacturing a sealed battery having an outer can with a mouth, an electrode assembly with a positive electrode plate and a negative electrode plate, a positive electrode collector plate and a negative electrode collector plate attached to the positive electrode plate and the negative electrode plate, respectively, and a sealing plate with an external terminal having a connecting terminal with a through-hole and an electrolyte pouring hole, the method includes a first step of attaching a current interruption mechanism to the connecting terminal to seal one end of the through-hole; a second step of flowing a gas from the other end of the through-hole to examine air leakage between the connecting terminal and the current interruption mechanism; and a third step of inserting a terminal stopper made of an elastic member into the through-hole.

In the method for manufacturing a sealed battery according to the aspect of the invention, because the air leakage between the connecting terminal and current interruption mechanism is examined in the second step, batteries with welding defects can be screened out in the assembly process, and moreover, because the terminal stopper made of an elastic member is inserted into the through-hole in the third step, entering an electrolyte into the through-hole can be inhibited during subsequent electrolyte pouring and water washing performed as necessary. Thus, according to the method for manufacturing a sealed battery according to the aspect of the invention, defectives are screened out in the process and a malfunction due to the corrosion of the current interruption mechanism does not occur, and consequently, a sealed battery with high reliability can be manufactured. Here, examples of the gas used for examining air leakage include an inert gas such as nitrogen ($N_2$) gas and dry air.

Furthermore, in the method for manufacturing a sealed battery according to the aspect of the invention, it is preferable that, in the third step, the terminal stopper composed of the elastic member and a metal plate is used, the terminal stopper made of the elastic member is inserted into the through-hole, and thereafter the metal plate is welded to the connecting terminal.

The terminal stopper may fall off by vibration and the like because of being composed of an elastic member. In the method for manufacturing a sealed battery according to the aspect of the invention, the terminal stopper composed of the elastic member and metal plate is used, and moreover, the metal plate is welded to the connecting terminal, so that the through-hole can be sealed more tightly. When the metal plate is welded, the welding is easier to perform by the laser welding method.

Furthermore, in the method for manufacturing a sealed battery according to the aspect of the invention, the current interruption mechanism includes the sealing tab, the inversion plate, and a collector having a breaking portion, wherein the method preferably includes attaching an inversion plate to a sealing tab, and thereafter, flowing a gas from the other end of the through-hole to examine.

According to the method for manufacturing a sealed battery according to the aspect of the invention, because the current interruption mechanism including the sealing tab, inversion plate, and collector having the breaking portion is used, the inversion plate is attached to the sealing tab, and thereafter, the air leakage between the sealing tab and inversion plate is examined. Therefore, the battery with welding defects can be screened out more exactly in the assembly process, and consequently, a sealed battery with higher reliability can be manufactured.

Furthermore, in the method for manufacturing a sealed battery according to the aspect of the invention, the method preferably includes attaching the breaking portion of the collector to the inversion plate, and thereafter, flowing a gas from the other end of the through-hole to examine.

According to the method for manufacturing a sealed battery according to the aspect of the invention, because the breaking portion of the collector is attached to the inversion plate, and thereafter, the air leakage between the inversion plate and the breaking portion of the collector is examined again, the battery with welding defects can be screened out more exactly in the assembly process. As a result of this, a sealed battery with higher reliability can be manufactured.

BRIEF DESCRIPTION OF THE DRAWINGS

FIGS. 5A through 5F are cross-sectional views showing a successive assembling process of the external terminal of the sealed battery in the embodiment of the invention.

DESCRIPTION OF EXEMPLARY EMBODIMENTS

Figure 1:
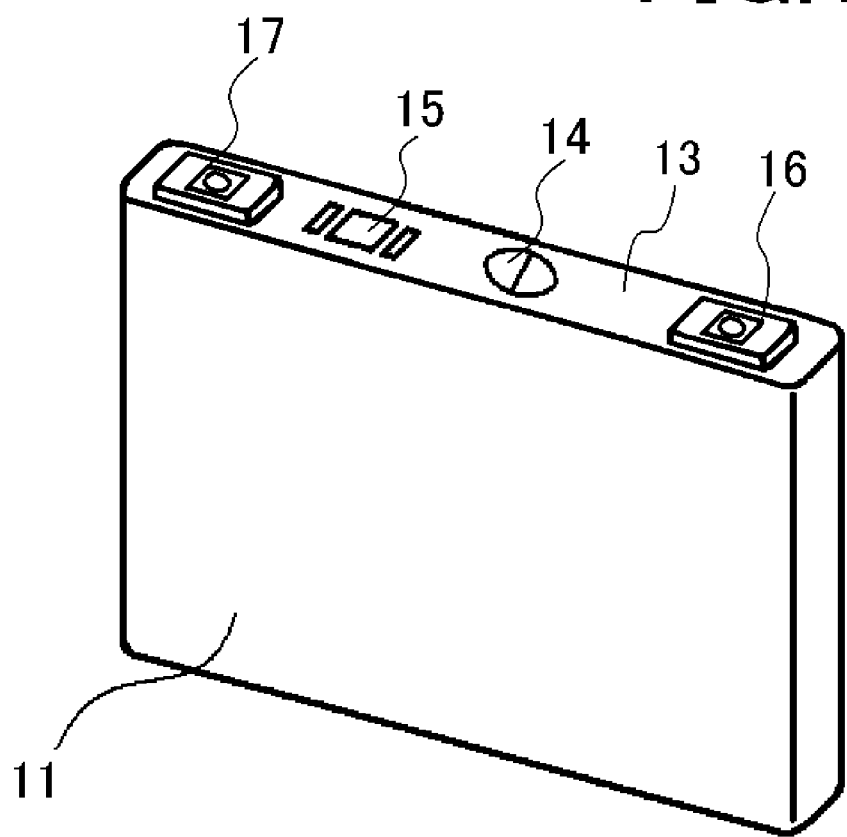
FIG. 1 is a perspective view of a sealed battery in the embodiment of the invention.
Figure 2:
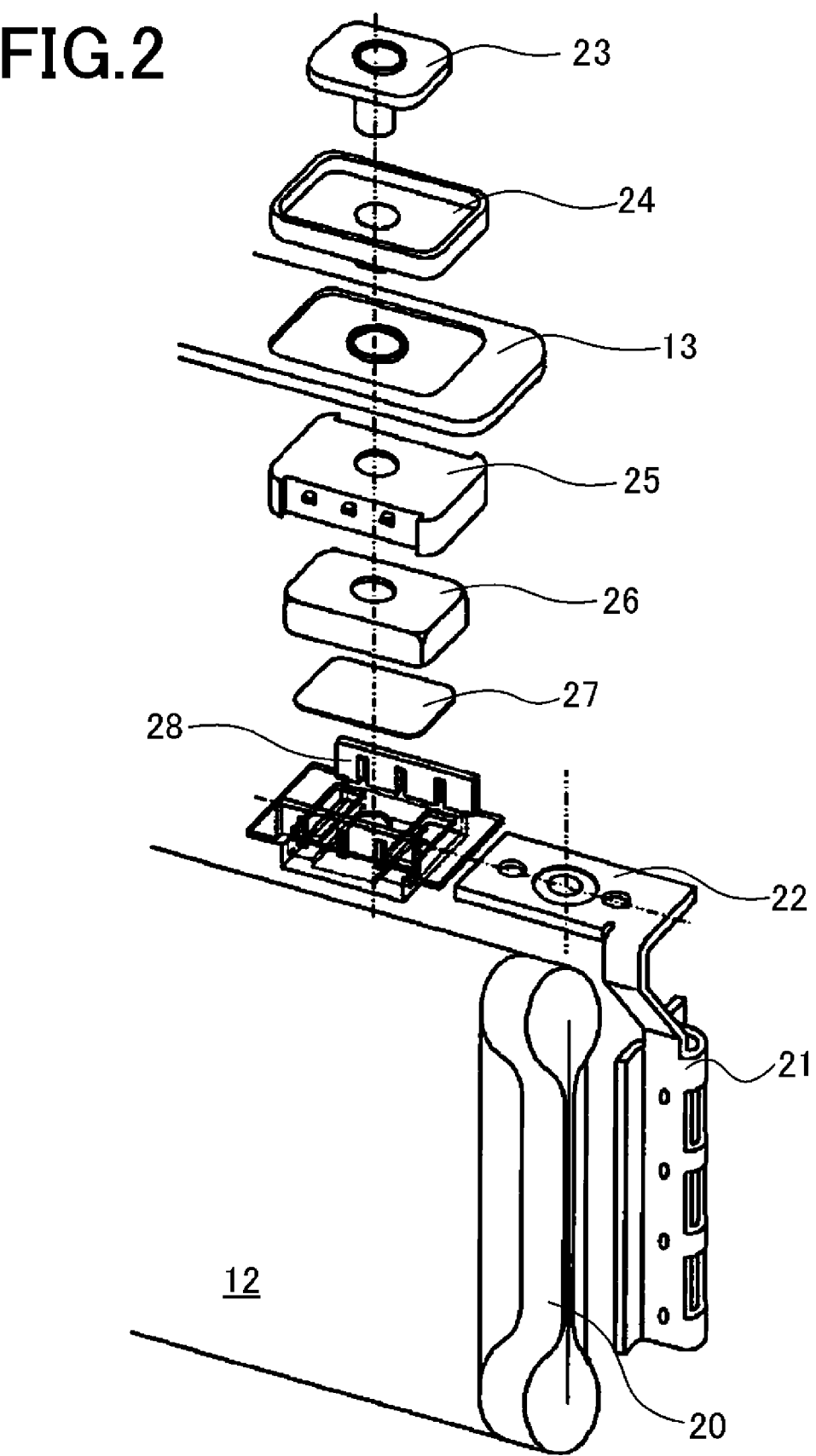
FIG. 2 is an exploded perspective view of an external terminal of the sealed battery shown in FIG. 1.

Hereinafter, exemplary embodiments of the invention will be described in detail with drawings, and, in the description below, the positive electrode external terminal of the positive electrode plate will be exemplified. In a sealed battery 10 of the present embodiment, as shown in FIG. 1 and FIG. 2, a positive electrode plate and negative electrode plate are rolled and pressed into a flat shape to form a rolled electrode assembly 12, the rolled electrode assembly 12 is stored in an outer can 11 in a transversal direction with respect to the axis direction of the outer can 11, and a mouth of the outer can 11 is sealed with a sealing plate 13. Furthermore, to the sealing plate 13, a gas exhaust valve 14, electrolyte pouring hole (not shown in the drawings) and sealing member 15 for the electrolyte pouring hole are installed. The gas exhaust valve 14 opens when the gas pressure is higher than the working pressure of a current interruption mechanism.

In addition, to the sealing plate 13, a positive electrode external terminal 16 and negative electrode external terminal 17 are formed outside of the sealed battery 10. The positive electrode external terminal 16 and negative electrode external terminal 17 are used with a suitable shaped terminal block, external connecting terminal, or the like (not shown in the drawings) according to whether the sealed battery is used alone, or the sealed batteries connected in series or in parallel are used, and the like. Hereinafter, the structure of the positive electrode external terminal 16 for the positive electrode plate will be described.

Figure 3:
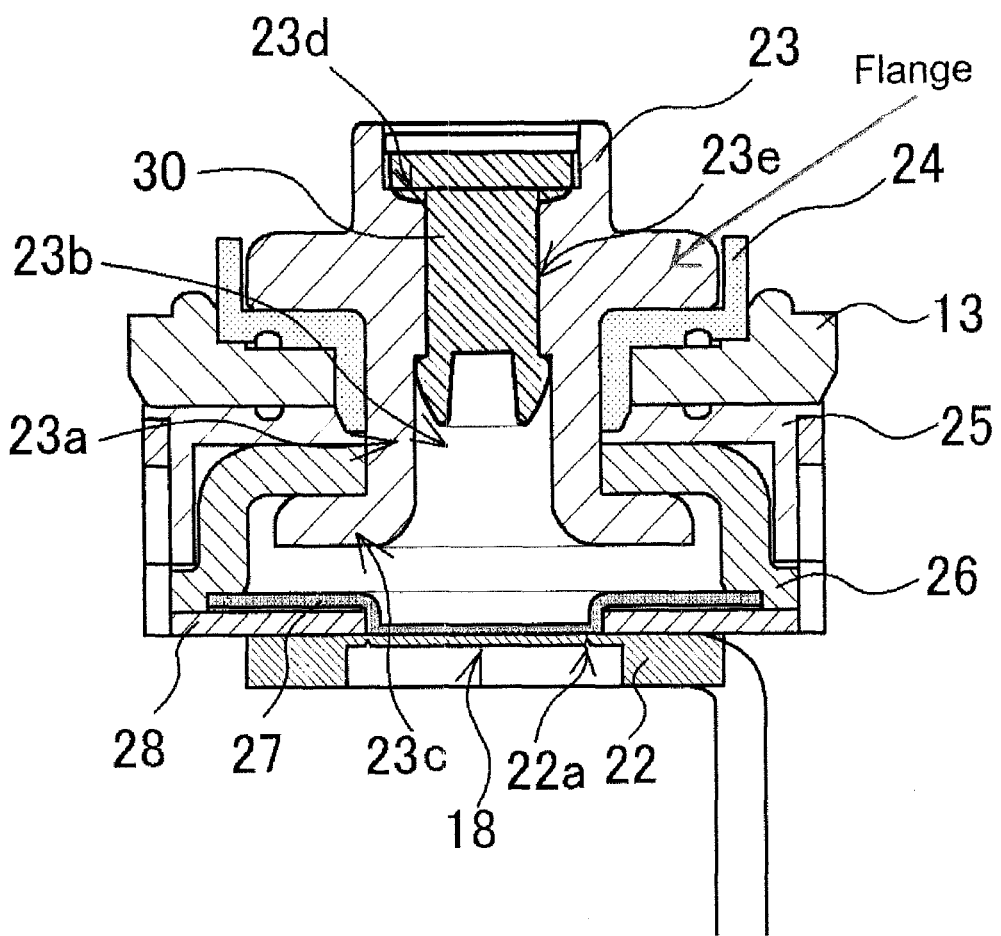
FIG. 3 is a cross-sectional view of the external terminal of the sealed battery shown in FIG. 1.

As shown in FIG. 2 and FIG. 3, a current collecting tab 21 is connected to, for example, a plurality of positive electrode substrates 20 protruded from one end of the rolled electrode assembly 12. From the current collecting tab 21, a collector 22 is extended. A connecting terminal 23 has a cylinder portion 23a, and a through-hole 23b is formed inside of the connecting terminal 23. Then, the cylinder portion 23a of the connecting terminal 23 is inserted into each hole formed in a gasket 24, the sealing plate 13, an insulating plate 25, and a sealing tab 26, and a leading end portion 23c is crimped to be fixed integrally.

Furthermore, a periphery of an inversion plate 27 is welded to a leading end portion of the sealing tab 26, and the collector 22 is welded to a central part of the inversion plate 27 by laser welding. A collector holder 28 made of resin is placed on peripheral parts of the collector 22 and inversion plate 27 for positioning of the collector 22 and inversion plate 27 and for electrical insulation of the peripheral parts. Therefore, the positive electrode substrate 20 is electrically connected to the connecting terminal 23 through the current collecting tab 21, collector 22, inversion plate 27, and sealing tab 26. In addition, such connecting terminal 23, gasket 24, sealing plate 13, insulating plate 25, sealing tab 26, inversion plate 27, collector holder 28, and collector 22 form the positive electrode external terminal 16 of the embodiment.

Here, the inversion plate 27 and collector 22 form a current interruption mechanism 18 according to an embodiment of the invention. That is, on the collector 22, a cyclic groove 22a is formed around the laser welded portion, and whereby, a portion with thin thickness is circularly formed. The inversion plate 27 is made to swell toward the through-hole 23b of the connecting terminal 23 when the pressure in the outer can 11 increases, and the collector 22 is welded to the central part of the inversion plate 27. Therefore, the collector 22 is broken at the cyclic groove 22a when the pressure in the outer can 11 exceeds a predetermined value, and accordingly, the electrical connection between the inversion plate 27 and collector 22 is interrupted. The current interruption mechanism 18 may employ another structure in which metal foil is welded to the inversion plate 27, then, the periphery of the welded part is welded to the collector to be used, and the metal foil is broken when the pressure in the outer can 11 increases to deform the inversion plate 27.

Figure 4:
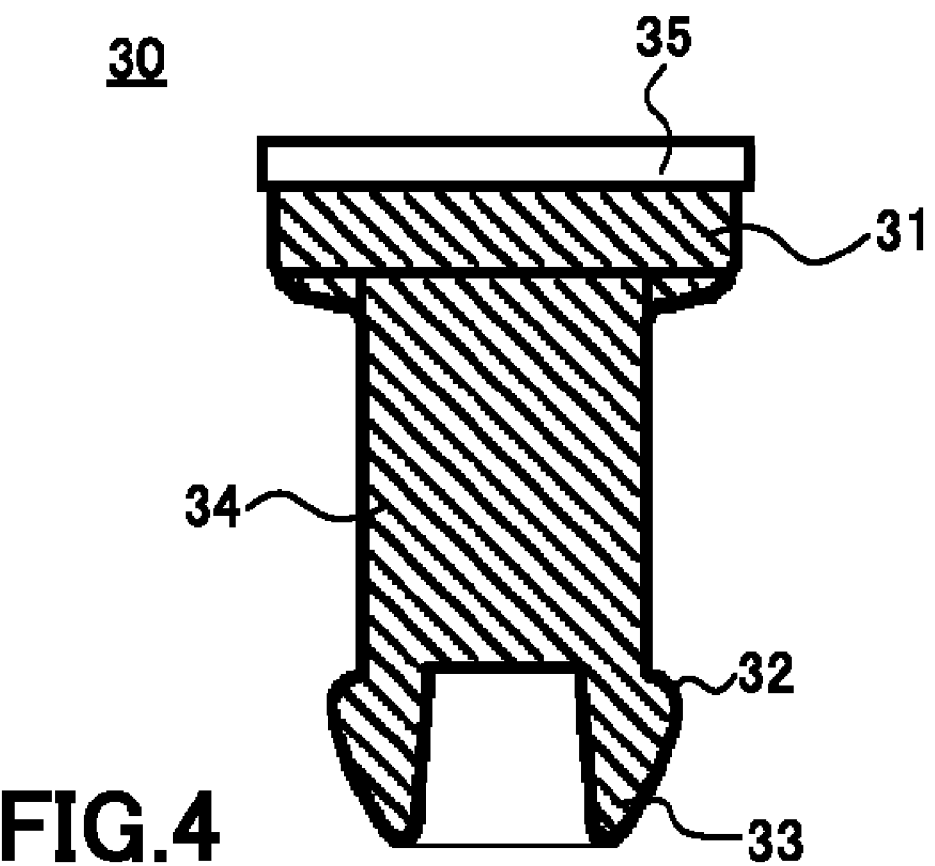
FIG. 4 is a cross-sectional view of a terminal stopper in the embodiment of the invention.
Figure 6A:
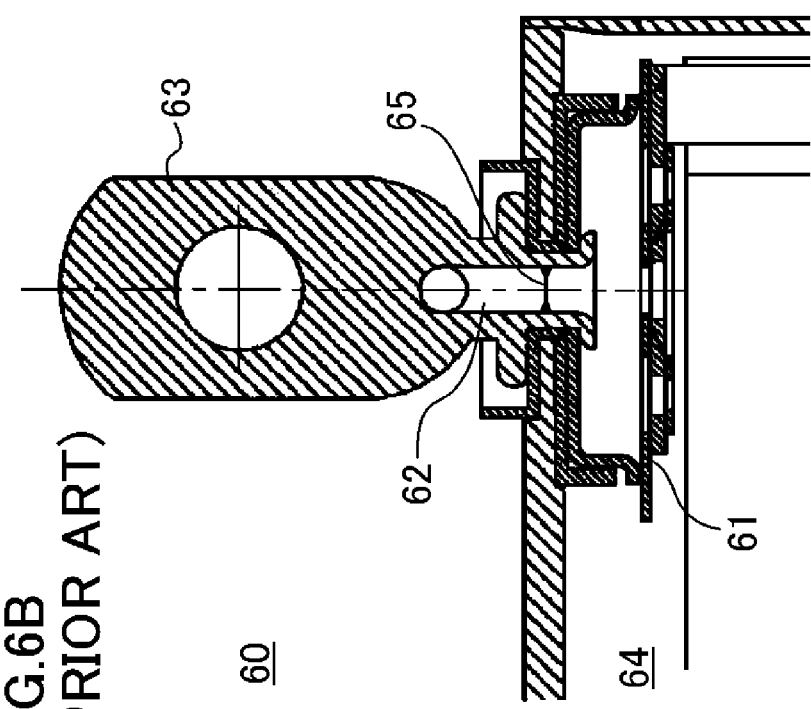
FIG. 6A is a cross-sectional view of an external terminal of a sealed battery of a related art example.
Figure 6B:
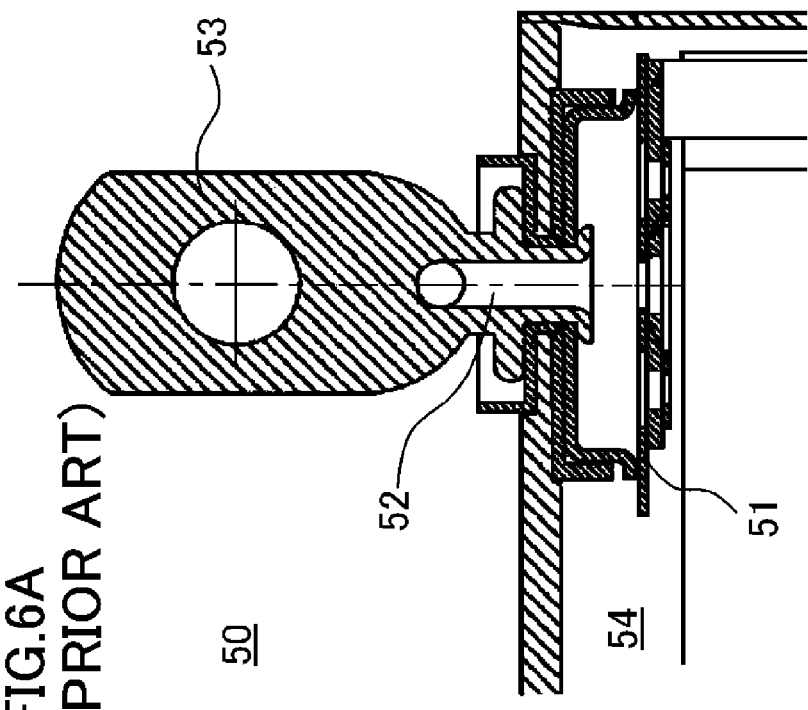
FIG. 6B is a cross-sectional view of an external terminal of a sealed battery of another related art example.

Furthermore, the through-hole 23b formed in the connecting terminal 23 has a large diameter portion 23d outside of the outer can 11 and a small diameter portion 23e inside of the outer can 11. As shown in FIG. 3, the through-hole 23b of the connecting terminal 23 is tightly sealed with a rubber terminal stopper 30. As shown in FIG. 4, the terminal stopper 30 includes, at the upper end, a head portion 31 having a diameter larger than that of the small diameter portion 23e of the through-hole 23b of the connecting terminal 23 and smaller than that of the large diameter portion 23d, at the lower end, a protruding portion 32 having a diameter smaller than that of the head portion 31 and larger than that of the small diameter portion 23e of the through-hole 23b, a locking portion 33 tapering from the protruding portion 32, and between the head portion and the protruding portion, a connecting portion 34 having almost the same diameter as that of the small diameter portion 23e of the through-hole 23b of the connecting terminal 23 and having substantially the same length as that of the small diameter portion 23e. Then, the terminal stopper 30 is attached to the through-hole 23b so that the head portion 31 would be placed on a side of the large diameter portion 23d of the through-hole 23b of the connecting terminal 23 and the locking portion 33 would be protruded from the end of the small diameter portion 23e of the through-hole 23b of the connecting terminal 23. Here, in order to strengthen the head portion 31 even when the thickness is made thin, a metal plate 35 made of aluminum or the like is installed on the surface of the head portion 31 of the terminal stopper 30.

The metal plate 35 can be welded to the connecting terminal 23 by, for example, laser welding. The terminal stopper 30 may fall off by vibration and the like because of being composed of an elastic member. However, when the metal plate 35 is welded to the connecting terminal 23, the through-hole 23b can be sealed more tightly with the terminal stopper 30.

The successive assembling process of the positive electrode external terminal 16 will be described with FIG. 5. First, the gasket 24 and connecting terminal 23 are arranged on the sealing plate 13, the cylinder portion 23a of the connecting terminal 23 is inserted into each mouth formed in the gasket 24 and sealing plate 13. Then, the cylinder portion 23a of the connecting terminal 23 is inserted into each mouth formed in the insulating plate 25 and sealing tab 26 from the opposite side of the gasket 24. After that, the leading end portion 23c of the cylinder portion 23a of the connecting terminal 23 is crimped to be fixed with the connecting terminal 23, gasket 24, sealing plate 13, insulating plate 25, and sealing tab 26, integrally (FIG. 5A).

Then, the periphery of the sealing tab 26 is welded to the inversion plate 27 so as to totally seal the periphery of the inversion plate 27 (FIG. 5B). Here, for the inversion plate 27, a thin aluminum plate is shaped so as to protrude downward to be used. The welding method between the sealing tab 26 and inversion plate 27 may employ laser welding method or ultrasonic welding method. Then, a gas, for example, an inert gas such as $N_2$ gas or dry air, with a predetermined pressure is introduced from the top of the connecting terminal 23 into the through-hole 23b to examine the sealing of the welded part between the sealing tab 26 and inversion plate 27 (FIG. 5C). The product that is determined to have incomplete sealing by the examination is excluded.

With regard to the product that is determined to have the passed welded part between the sealing tab 26 and inversion plate 27, the collector holder 28 made of resin is brought into contact with the inversion plate 27, the collector holder 28 and insulating plate 25 are latched, and then, a region surrounded by the groove 22a of the collector 22 and the inversion plate 27 are welded by the laser welding method or ultrasonic welding method (FIG. 5D). Thus, the current interruption mechanism 18 of the embodiment is completed.

Because the welding may adversely affect the welded part between the sealing tab 26 and inversion plate 27, a gas with a predetermined pressure is once again introduced from the top of the connecting terminal 23 into the through-hole 23b to examine the sealing of the welded part between the sealing tab 26 and inversion plate 27 (FIG. 5E). The second examination provides the higher reliability of the positive electrode external terminal 16 of the embodiment. However, the second examination is not always a necessary step, and may be carried out as necessary.

Then, the terminal stopper 30 is inserted into the through-hole 23b of the connecting terminal 23 (FIG. 5F), as necessary, the metal plate 35 of the terminal stopper 30 is welded to the connecting terminal 23 by, for example, laser welding to complete the positive electrode external terminal 16 for the positive electrode plate of the embodiment. The positive electrode external terminal 16 for the positive electrode plate may be used without any modification, but may be used with a suitable shaped terminal block, external connecting terminal, or the like (not shown in the drawings) attached according to whether the sealed battery 10 is used alone, or the sealed batteries 10 connected in series or in parallel are used, and the like.

Here, the structure of the positive electrode external terminal 16 for the positive electrode plate is described, but the structure may be employed to the negative electrode external terminal 17 for the negative electrode plate. However, when the structure having the current interruption mechanism 18 as described above is employed as the positive electrode external terminal 16 for the positive electrode plate, the negative electrode external terminal 17 for the negative electrode plate is not required to employ the current interruption mechanism. Therefore, the negative electrode external terminal 17 for the negative electrode plate can employ a simpler structure.

In order to complete the sealed battery 10 of the embodiment, the rolled electrode assembly 12 attached to the positive electrode external terminal 16 is inserted into the outer can 11, the sealing plate 13 is fitted to the mouth of the outer can 11, the fitted portion is sealed by laser welding, next, a predetermined amount of electrolyte is poured from the electrolyte pouring hole (not shown in the drawings), and then the electrolyte pouring hole is sealed with a sealing member 15. When pouring the electrolyte at this time, because the electrolyte may adhere to the surfaces of the outer can 11, sealing plate 13, and the like, the surfaces need to be cleaned by water washing. However, in the sealed battery 10 of the embodiment, because the terminal stopper 30 is tightly inserted into the through-hole 23b of the connecting terminal 23, the electrolyte or washing water cannot enter the through-hole 23b of the connecting terminal 23, whereby, the action of the current interruption mechanism 18 is not adversely affected.

In addition, in the sealed battery 10 of the embodiment, the space on the current interruption mechanism 18 at the side corresponding to the outside of the battery is totally sealed. However, even when the pressure in the outer can 11 is increased by any reason, because the pressure of gas generated in the battery under abnormal conditions is very high, the pressure in the closed space on the current interruption mechanism 18 at the side corresponding to the outside of the battery seldom simultaneously increases equally. Thus, there is no problem even when the space on the current interruption mechanism 18 at the side corresponding to the outside of the battery is sealed.

What is claimed is:

1. A sealed battery comprising:
an outer can including a mouth;
in the outer can, an electrode assembly including a positive electrode plate and a negative electrode plate;
a sealing plate sealing the mouth of the outer can; and
an external terminal attached to the sealing plate and including a connecting terminal, the connecting terminal and the electrode assembly being electrically connected;
in a conductive pathway electrically connecting the connecting terminal and the electrode assembly, a current interruption mechanism that interrupts current in response to pressure increase in the outer can being installed;
the connecting terminal including inside a through-hole continuing a space on the current interruption mechanism at a side corresponding to the outside of the battery; and
the through-hole being tightly sealed.

2. The sealed battery according to claim 1, wherein the through-hole is sealed with a terminal stopper.

3. The sealed battery according to claim 2, wherein the terminal stopper includes an elastic member.

4. The sealed battery according to claim 2, wherein the terminal stopper includes a metallic member.

5. The sealed battery according to claim 2, wherein the terminal stopper includes an elastic member and a metallic member.

6. A sealed battery comprising:
an outer can including a mouth;
in the outer can, an electrode assembly including a positive electrode plate and a negative electrode plate;
a sealing plate sealing the mouth of the outer can; and
an external terminal attached to the sealing plate and including a connecting terminal, the connecting terminal and the electrode assembly being electrically connected;
in a conductive pathway electrically connecting the connecting terminal and the electrode assembly, a current interruption mechanism that interrupts current in response to pressure increase in the outer can being installed;
the connecting terminal including inside a through-hole continuing a space on the current interruption mechanism at a side corresponding to the outside of the battery; and
the through-hole being sealed with a metallic member.

7. The sealed battery according to claim 6, wherein the metallic member is welded to the connecting terminal.

8. The sealed battery according to claim 7, wherein the metallic terminal member is fitted into the through-hole and is welded to the connecting terminal.

9. The sealed battery according to claim 3, wherein
the through-hole formed in the connecting terminal includes a large diameter portion formed outside of the outer can and a small diameter portion formed inside of the outer can;
the terminal stopper includes, at an upper end, a head portion having a diameter larger than that of the small diameter portion of the through-hole and smaller than that of the large diameter portion of the through-hole, at a lower end, a protruding portion having a diameter smaller than that of the head portion and larger than that of the small diameter portion of the through-hole, a locking portion tapering from the protruding portion, and between the head portion and the protruding portion, a connecting portion having almost the same diameter as that of the small diameter portion of the through-hole and having substantially the same length as that of the small diameter portion of the through-hole; and
the terminal stopper is attached to the through-hole in which the head portion is placed on a side of the large diameter portion of the through-hole and the locking portion is protruded from an end of the small diameter portion of the through-hole.

* * * * *